(12) United States Patent
Frikha et al.

(10) Patent No.: US 11,487,844 B2
(45) Date of Patent: Nov. 1, 2022

(54) SYSTEM AND METHOD FOR AUTOMATIC DETECTION OF WEBPAGE ZONES OF INTEREST

(71) Applicant: Content Square SAS, Paris (FR)

(72) Inventors: Slim Frikha, Paris (FR); Mohamed-Amine Baatout, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 16/915,190

(22) Filed: Jun. 29, 2020

(65) Prior Publication Data
US 2021/0406337 A1     Dec. 30, 2021

(51) Int. Cl.
| | | |
|---|---|---|
| *G06F 40/00* | (2020.01) | |
| *G06F 16/958* | (2019.01) | |
| *G06N 20/00* | (2019.01) | |
| *G06K 9/62* | (2022.01) | |
| *G06F 40/106* | (2020.01) | |
| *G06F 40/14* | (2020.01) | |
| *G06V 30/412* | (2022.01) | |

(52) U.S. Cl.
CPC .......... *G06F 16/986* (2019.01); *G06F 40/106* (2020.01); *G06F 40/14* (2020.01); *G06K 9/6256* (2013.01); *G06N 20/00* (2019.01); *G06V 30/412* (2022.01)

(58) Field of Classification Search
CPC .............................. G06F 40/106; G06F 40/14
See application file for complete search history.

(56) References Cited

U.S. PATENT DOCUMENTS

| | | | |
|---|---|---|---|
| 8,566,746 B2* | 10/2013 | Chuat | G06F 16/583 |
| | | | 715/833 |
| 2009/0248608 A1 | 10/2009 | Ravikumar et al. | |
| 2012/0005686 A1* | 1/2012 | Rajan | G06F 40/137 |
| | | | 718/105 |
| 2012/0144288 A1* | 6/2012 | Caruso | G06F 16/9577 |
| | | | 715/234 |

(Continued)

OTHER PUBLICATIONS

AWS: Automatic webpage segmentation. IEEE Conference Publication. 11 pages. Retreived from https://ieeexplore.ieee.org/document/7498442/keywords#keywords. 2016. (Year: 2016).*

(Continued)

*Primary Examiner* — Scott T Baderman
*Assistant Examiner* — Barbara M Level
(74) *Attorney, Agent, or Firm* — Schwegman Lundberg & Woessner, P.A.

(57) ABSTRACT

A system and method for detecting webpage zones of interest. A method includes receiving at least one webpage analysis request, wherein the received at least one webpage analysis request includes at least one webpage in a website; identifying, in the at least one webpage, at least one zone, wherein the at least one zone is a content element of a webpage; classifying the at least one zone into a category of interest, wherein the classification is based on a trained machine learning model configured to classify DOM elements of the least one webpage, and wherein a category of interest is a category determined based on a functionality of the website; and storing the classification by indicating the category of interest for each zone.

15 Claims, 11 Drawing Sheets

(56) References Cited

U.S. PATENT DOCUMENTS

| | | | |
|---|---|---|---|
| 2016/0070731 A1* | 3/2016 | Chang | G06F 16/958 |
| | | | 707/741 |
| 2016/0078022 A1* | 3/2016 | Lisuk | G06F 40/117 |
| | | | 706/12 |
| 2017/0078310 A1 | 3/2017 | Hunt et al. | |
| 2017/0372408 A1* | 12/2017 | Khandelwal | G06Q 30/0641 |
| 2018/0144269 A1* | 5/2018 | Wilson | G06N 5/022 |
| 2018/0336574 A1 | 11/2018 | Mohan et al. | |
| 2020/0210511 A1* | 7/2020 | Korobov | G06F 16/957 |

OTHER PUBLICATIONS

Understanding the layout of webpages using automatic zone recognition, by Julien Dumazert, 10 pages, Retrieved at https://medium.com/contentwquare-engineering-blog/automatic-zone-recognitio-in-webpages-68fb2efab822, Mar. 6, 2017. (Year: 2017).*

International Search Report and Written Opinion of International Searching Authority for PCT/IB2020/056134, ISA/NL, Rijswijk, Netherlands, dated Mar. 4, 2021.

"International Application Serial No. PCT IB2020 056134, International Search Report dated Mar. 12, 2021", 4 pages.

"International Application Serial No. PCT IB2020 056134, Written Opinion dated Mar. 12, 2021", 7 pages.

* cited by examiner

| account creation | cart | category | home | product | checkout / lead generation |
|---|---|---|---|---|---|
| account | account | account | account | account | account |
| cart | breadcrumb | all_products | cart | breadcrumb | cart |
| first_name | cart | breadcrumb | menu | cross_sell | cta_already_have_account |
| surname | continue_shopping | cart | push_product | search_bar | cta_connection |
| miss_mr | search_bar | cta_add_to_cart | push_social_media | features_selection | cta_create_an_account |
| search_bar | delete | cta_see_product | search_bar | in_store_availability | cta_proceed |
| menu | menu | filters | banner | menu | email_address |
| client_email | product_picture | menu | slideshow | product_tiny_pictures | facebook_login |
| client_password | push_product | pagination_cta_see_more | special_offer | product_details | forgot_password |
| creation_email | promotional_code | product_picture | push_branding | quantity | general_conditions |
| creation_password | quantity | search_bar | push_category | cta_add_to_cart | guest_checkout |
| creation_password_confirmation | cta_submit_basket | sort | | shipping_information | menu |
| cta_proceed | reinsurance | banner | | back_to_list | password |
| general_conditions | product_title | slideshow | | in_store_reservation | search_bar |
| | | product_quick_view | | find_a_store | |
| | | | | historic | |
| | | | | wishlist | |
| | | | | product_big_picture | |
| | | | | link_to_reviews | |

Fig. 6

SYSTEM AND METHOD FOR AUTOMATIC DETECTION OF WEBPAGE ZONES OF INTEREST

TECHNICAL FIELD

The present disclosure relates generally to analysis of webpage elements and, specifically, to systems and methods for automatic detection of zones of interest within webpages.

BACKGROUND

As web access and use becomes increasingly prevalent, the volume of web-based content in commerce, education, communication, and entertainment, among other fields, continues to increase. Further, the increasing prevalence of web-based content includes both expanding bases of web content and increasing complexity of the same. A given website or page may include dozens or hundreds of unique zones or elements. While webpage content, including the relevant zones and elements, may be designed to improve a user's experience, the variety of ways in which the various zones or elements can be arranged reduces the ability of a site administrator to quickly understand the content and arrangement of a page, particularly using automated methods, allowing the administrator to execute various improvements of a given page or site.

The difficulties of automatically analyzing webpage zones or elements presents a significant hurdle to subsequent applications of web-optimization technologies. Certain solutions in webpage zone or element analysis include parsing solutions. However, such solutions may not indicate whether a given zone is of interest. Classification applications, in certain solutions used for detection of zones of interest, may be limited to detection only of webpage layout zone types, such as headers, footers, navigation elements, logos, as well as other zone types, and may lack the capacity to automatically detect zones of interest which are critical to a positive user experience.

Further, classification solutions may lack performance optimizations necessary to provide the user experience expected, and may be limited to isolated zone classification and detection, detecting and classifying zones based only on code-level zone descriptions, such as an HTML header tag, rather than detection and classification based on page structure information. In addition, a classification solution may be limited by the nature of the solutions' independent binary classification models, where the number of trained models generated to detect zones is related to the number of types of zones to be detected, such as may be the case for models trained to identify a zone as a header or not a header, and the like, compounding the noted lack of performance optimizations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for detecting webpage zones of interest. The method comprises: receiving at least one webpage analysis request, wherein the received at least one webpage analysis request includes at least one webpage in a website; identifying, in the at least one webpage, at least one zone, wherein the at least one zone is a content element of a webpage; classifying the at least one zone into a category of interest, wherein the classification is based on a trained machine learning model configured to classify DOM elements of the least one webpage, and
wherein a category of interest is a category determined based on a functionality of the website; and storing the classification by indicating the category of interest for each zone.

Further, certain embodiments disclosed herein also include a non-transitory computer readable medium having stored thereon instructions for causing a processing circuitry to execute a process. The process comprises: receiving at least one webpage analysis request, wherein the received at least one webpage analysis request includes at least one webpage in a website; identifying, in the at least one webpage, at least one zone, wherein the at least one zone is a content element of a webpage; classifying the at least one zone into a category of interest, wherein the classification is based on a trained machine learning model configured to classify DOM elements of the least one webpage, and wherein a category of interest is a category determined based on a functionality of the website; and storing the classification by indicating the category of interest for each zone.

In addition, certain embodiments disclosed herein include a system for detecting webpage zones of interest. The system comprises: a processing circuitry; and a memory, the memory containing instructions that, when executed by the processing circuitry, configure the system to: receive at least one webpage analysis request, wherein the received at least one webpage analysis request includes at least one webpage in a website; identify, in the at least one webpage, at least one zone, wherein the at least one zone is a content element of a webpage; classify the at least one zone into a category of interest, wherein the classification is based on a trained machine learning model configured to classify DOM elements of the least one webpage, and wherein a category of interest is a category determined based on a functionality of the website; and store the classification by indicating the category of interest for each zone.

BRIEF DESCRIPTION OF THE DRAWINGS

The foregoing and other objects, features, and advantages of the disclosed embodiments will be apparent from the following detailed description taken in conjunction with the accompanying drawings.

FIG. 6 is a page and zone categorization table, according to an embodiment.

DETAILED DESCRIPTION

Figure 1:
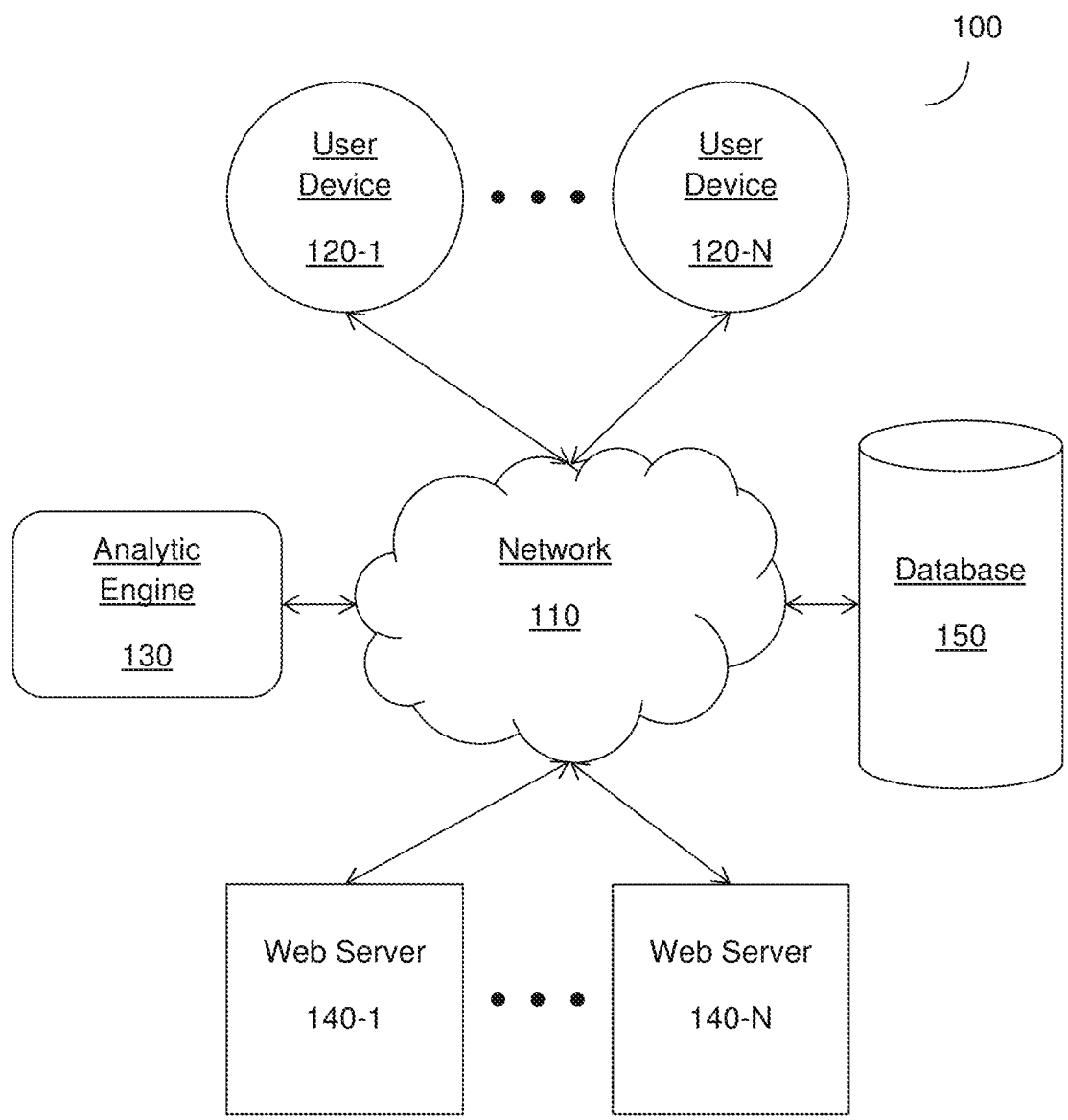
FIG. 1 is an example network diagram depicting a network system disclosing the embodiments for automatic detection of webpage zones of interest.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for automatic detection of webpage zones of interest. As webpages may include a variety of content zones and elements which may be relevant to user experience, classification of such zones and elements may provide for application of additional solutions to optimize various aspects of webpage user experiences. The disclosed system and method addresses the need for such classifications, providing an application of machine learning techniques to the automatic detection and classification of webpage content zones and elements.

FIG. 1 is an example network diagram depicting a network system 100 disclosing the embodiments for automatic detection of webpage zones of interest. The system 100 includes one or more user devices, 120-1 through 120-N (hereinafter, "user device" 120 or "user devices" 120), an analytic engine 130, one or more web servers, 140-1 through 140-N (hereinafter "web server" 140 or "web servers" 140), and a database 150. Further, in the system, the various components listed are interconnected via a network 110.

The network 110 provides interconnectivity between the various components of the system. The network 110 may be, but is not limited to, a wireless, cellular or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth™, long-term evolution (LTE), Wi-Fi, other, like, wireless means, and any combination thereof, or via wired means such as, as examples and without limitation, ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing webpage analysis requests to the system 100 for detection and classification of content elements and zones, receiving classification reports from the system 100, configuring system 100 parameters, other, like, purposes, and any combination thereof. The user devices 120 may be devices configured to allow a user to receive information through features such as, as examples and without limitation, video screens, audio speakers, text printers, and other, like, output features. The user devices 120 may be further configured to allow a user to input information. Further, the user devices 120 may be configured to allow users to simultaneously receive and input information, including simultaneously. The user devices 120 may include one or more components configured to provide network connectivity, allowing the user devices 120 to connect with the network 110, including by the means described with respect to the network 110, above. Examples of user devices 120 may be smartphones, personal computers, business systems, dedicated kiosks, tablet computers, and other, like, devices.

The analytic engine 130, depicted in detail with respect to FIG. 8, below, is a system configured to execute instructions, organize information, and otherwise process data. The analytic engine 130 may be configured to execute the methods described hereinbelow, other, like, methods, and any combination thereof. As described with respect to FIG. 8, below, the analytic engine 130 may include various processing, memory, networking, and other components allowing the analytic engine 130 to execute instructions and provide data processing. The analytic engine 130 may be implemented as physical hardware, as software virtualizing physical hardware, or as a combination of physical and virtualized components. The analytic engine 130 may be connected to the network 110 via those means described with respect to the network 110, above.

According to the disclosed embodiments, the analytic engine 130 is configured to identify zones of interest within websites and webpages. A zone is an area in a webpage including one or more objects. Such zones may be features of common web technologies such as Hypertext Markup Language (HTML) and Cascading Style Sheets (CSS), and may provide for rich user interactions with a website or page. As an example, an online retailer's page may include zones or elements allowing users to search for products, to add products to a digital shopping cart, to contact a retailer's support specialist via a chat popup, and the like. A zone of interest may be a webpage zone or element directed to a particular function or aspect of the user experience, where various zones of interest may be defined in various contexts, including by manual specification of specific zones of interest and automatic identification of zones of interest based on factors including, without limitation, collected site usage data, intended site functions, such as social, shopping, and the like, other, like, factors, and any combination thereof. An example of a zone of interest may be a table of product prices on a shopping website, distinguished from other zones in the same website by a particular specification describing product-related zones as zones of interest and other zones as not of interest.

As will be discussed in detail below, the analytic engine 130 is configured to identify webpage zones of interest by receiving a webpage analysis request, identifying webpage content elements and zones, and classifying webpage content elements and zones. The classification may be performed using one or more machine learning techniques.

The web servers 140 may be one or more sources of data other than the inputs received from the user devices 120. The web servers 140 may include data relating to execution of instructions, data relating to the training of models, as described hereinbelow, other, like, data, and any combination thereof. Data from the web servers 140 may be stored in the database 150 and may be processed by the analytic engine 130. Web servers 140 may be local sources, remote sources, or any combination thereof. Examples of web servers 140 include, without limitation, repositories of webpage information, repositories of webpage element or zone classifications, "live" webpages, other, like, sources, and any combination thereof. Web servers 140 may be connected with the network 110 via the means described hereinabove. In some configurations, the web sources 140 may include one or more data sources sorting content elements that can be utilized to train a model, as described hereinbelow.

Further, where detection of webpage zones of interest is achieved via methods including the receipt of a webpage analysis request, such as those described hereinbelow, the webpage analysis request may include a specification of a specific webpage, with the contents of the specific webpage being drawn, by the system executing such a method, from the web servers 140. In addition, where detection of webpage zones of interest includes the training of one or more models or algorithms based on a predefined dataset, the dataset including various webpages, the webpages included in the training dataset, and the contents thereof, may be drawn, by the system training the models or algorithms, from the web servers 140.

The database 150 is a data store configured to archive data permanently or semi-permanently. The database 150 may be configured to store information received from one or more web servers 140, user devices 120, and other, like, components, as well as to store data relevant to the operation of the analytic engine 130 and any outputs therefrom. The database 150 may be a local system, a remote system, or a hybrid remote-local system. Further, the database 150 may be configured as a full-physical system, including exclusively physical components, as a virtualized system, including only virtualized components, or as a hybrid physical-virtual system.

The database 150 may be configured to store or otherwise archive data relating to detection, identification, and classification of webpage zones and elements of interest including, without limitation, webpages, HTML code, Document Object Model (DOM) trees, training datasets, user inputs, other, like, data, and any combination thereof. Further, the database 150 may be configured to transfer, to and from the analytic engine 130, data necessary for the execution of the methods described hereinbelow, and may store or otherwise archive analytic engine 130 inputs, analytic engine 130 outputs, or both.

Figure 2:
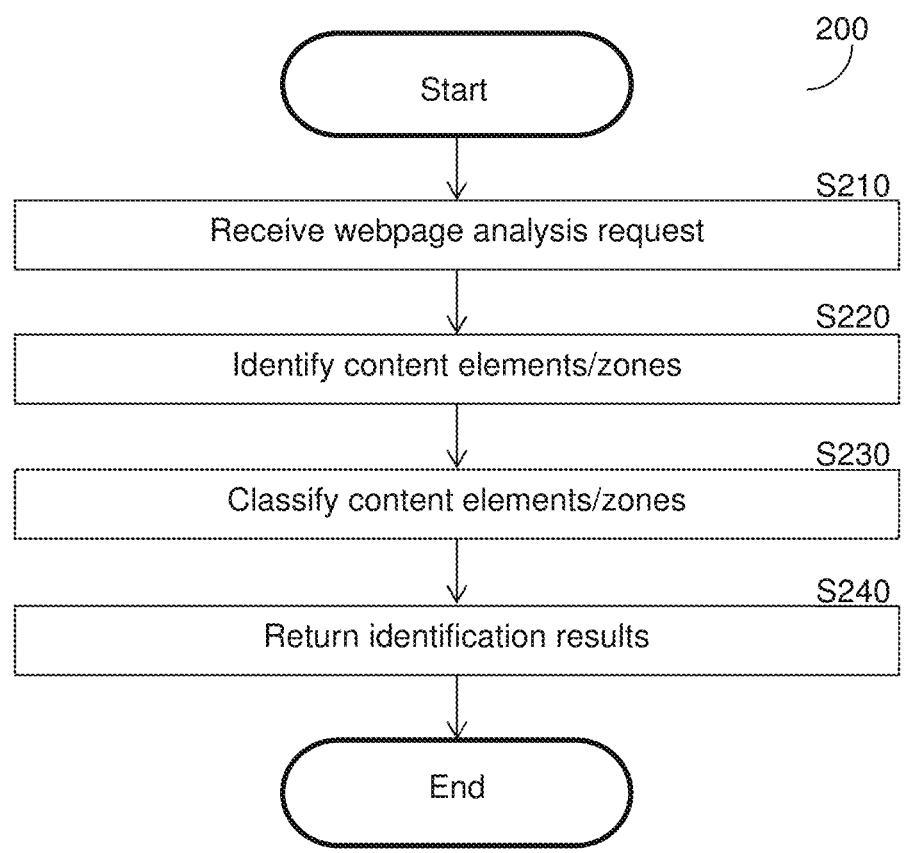
FIG. 2 is an example flowchart describing a method for automatic detection of webpage zones of interest, according to an embodiment.

FIG. 2 is an example flowchart 200 describing a method for automatic detection of webpage zones of interest, according to an embodiment. The method depicted in the flowchart 200 may be applicable to the detection of one or more predefined zone or element types within a webpage. It may be noted that, while the flowchart 200 describes a method relevant to a single webpage, the same or similar methods may be applicable to multiple webpages, including simultaneous execution for multiple webpages, without loss of generality or departure from the scope of the disclosure.

At S210, a webpage analysis request is received. A webpage analysis request may include a specific webpage or set of webpages in which a user wishes to detect zones of interest. A webpage analysis request may be received from a user device, such as the user device, 120, of FIG. 1, above. A webpage analysis request may be generated by user interaction with an online analysis portal, a browser extension connected to a web browser installed in a user device, such as the user device 120, of FIG. 1, above, an application installed on such a user device, other, like, interactions, and any combination thereof. The webpage analysis request may be sent, via a network, such as the network, 110, of FIG. 1, above, to an analytic engine, such as the analytic engine, 130, of FIG. 1, above. Further, one or more webpage analysis requests may be stored in a database, such as the database, 150, of FIG. 1, above. Webpage analysis requests stored in a database may be processed, either simultaneously or in any order, including by order of receipt, by an analytic engine, such as that described above, according to the method described hereinbelow, as well as according to other, like, methods.

In an embodiment, a webpage analysis request, as received at S210, may include a specification of a page category. A specification of a page category may be included in the request generated as described above, and may specify one or more categories, such as those included in the example categorization table of FIG. 6, below, as well as other, like, categories. A specification of a page category may provide for streamlined zone and element detection and identification by specifying that the received webpage analysis request is relevant only to zones or elements falling within the sub-categories included in the request's category specification.

At S220, content elements and zones are identified. Content elements and zones are identified based on the contents of the code defining the contents of the webpage specified in the webpage analysis request received at S210. The code defining the contents of the webpage may be Hypertext Markup Language (HTML) or another, similar webpage formatting or markup language. The code defining the elements of the webpage may include element or zone labels delineating the various elements or zones of the webpage. As an example, the HTML code for a given webpage may include code contained within a "header" section, defined by a specific header tag. In the same example, the header section may be defined by a first tag and a second tag marking the beginning and end of the header section. Further, the contents of a given section, marked by tags, as described above, may be further sub-sectioned such that a first section may contain first, second, and third subsections, each containing various zones.

Content elements and zones may be identified by analysis of the underlying HTML code of a webpage and the corresponding document object model (DOM) tree describing the given webpage. As described in detail with respect to FIG. 5A, below, a DOM tree may provide a hierarchical description of the elements of a webpage and the various sections and subsections of the webpage to which those elements belong. Analysis of a webpage's DOM tree to identify content zones and elements may include the detection of one or more content elements or zones, represented in a DOM tree as nodes. Content elements or zones may be detected by the application of natural language processing (NLP) techniques, and other, like, techniques, to the HTML code underlying the webpage. In application of NLP techniques, and other, like, techniques, the text of the HTML code may be analyzed to detect characters, strings, and other text features corresponding to webpage content elements or zones. As an example, application of NLP techniques to the identification of content elements or zones within the HTML code underlying a webpage may include the detection of "<header>" and "</header>" strings, representing the beginning and end, respectively, of a header section of a webpage.

At S230, content elements and zones are classified. Content elements and zones may be classified at S230 based on the content elements and zones identified at S220 and the application of one or more machine learning or similar models, the training of which is described with respect to FIG. 4, below. Classification at S230 may include the classification of content elements or zones into various content categories and sub-categories, such as those included in the categorization table, 600, of FIG. 6, below, including through the use of a trained model, as described with respect to FIG. 3, below. The classification of content elements and zones at S230 may include a selective classification configuration. In a selective classification configuration, only content zones or elements matching specific categories or subcategories are classified according to their respective categories or sub-categories, while content zones or elements not matching the same specific categories or subcategories are be classified as "other," providing for reduced processing load during execution and improved classification speed and efficiency. Classification of zones or elements according to pre-defined categories or subcategories may be achieved through the application of one or more categorization tables, such as that described with respect to FIG. 6, below. As an example, a selective classification configuration may include the classification of zones as "menu," "account," "cart," and "other," where the webpage analysis request received at S210 includes a specification indicating that the user or administrator wishes to detect only "menu," "cart," and "account" zones, or where the same categories make up the full extent of all applicable pre-defined categories. The classification of content elements and zones at S230 may include the labeling of webpage content elements and zones in the corresponding DOM trees, reflecting the underlying HTML code, as is described with respect to FIG. 5B, below.

At S240, the results of the zone classification are returned. The results of the classification returned at S240 may be returned visually, as shaded highlights and zone labels appearing over relevant content elements or zones, as depicted with respect to FIG. 7B, below. Further, returning the results of the classification at S240 may include the generation and return of one or more zone identification confidence scores, as depicted with respect to FIG. 7C, below. Zone identification confidence scores reflect the degree of certainty regarding the classification applied to a particular content zone or element. Zone identification confidence scores may be presented as percentages, reflecting the likelihood that the given content zone or element matches the corresponding classification. Zone identification confidence scores may be generated based on the HTML code represented by the given content zone or element, the rules developed during training of the machine learning model, as described with respect to FIG. 4, below, other, like, factors, and any combination thereof.

In an embodiment, returning classification results at S240 may include returning zone shading indicators, zone labels, and zone identification confidence scores for some, all, or none of the zones or elements included in a given webpage, including return of shading indicators, labels, and confidence scores for specific zones or elements, as well as categories and subcategories thereof, as specified by an operator, administrator, or other user. Further, returning classification results at S240 may include returning classification results in formats other than those described, including, without limitation, textual descriptions, labeled HTML code sets, labeled DOM trees, other, like, formats, and any combination thereof. Classification results returned at S240 may be displayed visually for user interpretation, saved to a storage medium, or otherwise retained for subsequent evaluation.

Figure 3:
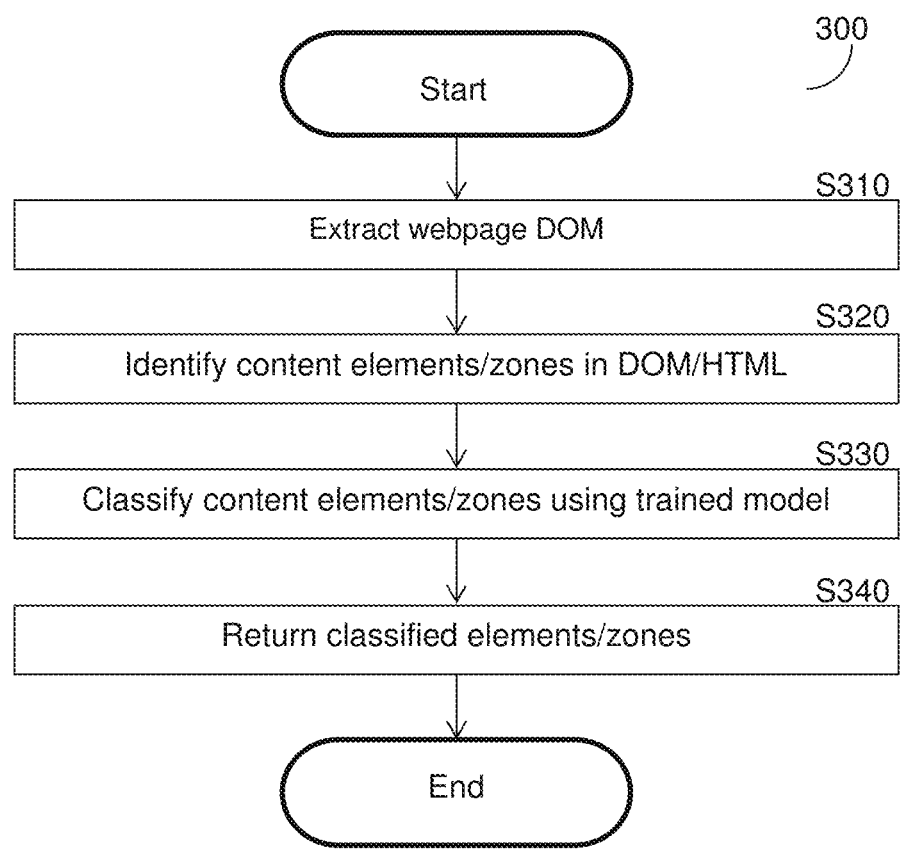
FIG. 3 is an example flowchart describing a method for classifying webpage zones and elements using a trained model, according to an embodiment.

FIG. 3 is an example flowchart 300 describing a method for classifying webpage zones and elements using a trained model, according to an embodiment.

At S310, a webpage's document object model (DOM) is extracted. The webpage's document object model (DOM) describes the content and structure of the HTML code underlying the webpage. The DOM may be represented visually as a "node-and-link" tree graph, such as that shown with respect to FIG. 5A, below. The webpage's DOM may be extracted by analysis of the webpage's underlying HTML code using methods including, without limitation, application of various application programming interfaces (APIs) directed to the generation of DOMs based on HTML, as well as other, like, methods. Where APIs directed to the generation of DOMs based on HTML are applied to the extraction of a webpage's DOM, the APIs applied may be included in a web browser, may be integrated in another application, or may be configured to operate as standalone interfaces for DOM extraction.

At S320, content elements and zones are identified in the extracted DOM and in the webpage's HTML code. Content elements and zones may be identified in the extracted DOM by analysis of the DOM's contents and structure. Content elements and zones may be identified in the DOM by assessment of the "nodes" included in the DOM, describing the elements and zones included in the webpage, and by assessment of the "links" between the nodes, describing the hierarchy or structure of the webpage represented by the DOM.

Content elements and zones may be identified in the webpage's HTML code by application of techniques including, without limitation, natural language processing (NLP), and the like. In the application of NLP techniques to the identification of content elements and zones in the webpage's HTML code, the HTML code underlying the website may be analyzed as text, with characters, strings, or other text features serving to identify content zones or elements. As an example, a header element may be identified in a webpage's underlying HTML code by application of NLP techniques, where the applied NLP techniques may include identifying a given zone where a first detected string reads "<ZONE>" and a second detected string reads </ZONE>." In the example, "ZONE" is provided as an example string which may be substituted for other, relevant strings in NLP analysis.

At S330, content elements and zones are classified using a trained model. Content elements and zones may be classified using a trained model where the content elements and zones identified at S320 may be used as the inputs for such a model. A trained model may be configured to correlate the identified content elements and zones with one or more content element or zone labels based on a set of classification rules developed during training. The training of a model for classification of content elements and zones is described in detail with respect to FIG. 4, below.

At S340, classified content elements and zones are returned. Classified content elements and zones may include the individual content elements and zones identified at S320, coupled with the content element and zone labels developed during classification at S330. Classified content elements and zones may be returned as labeled HTML code, labeled DOMs, in other, like, formats, and any combination thereof. Labeled HTML code may be the webpage's underlying HTML code, including code features, comment strings, or other, like, features describing the labels of each zone or element on a per-zone or per-element basis, with respect to the appropriate zones and elements in the underlying HTML code. Further, classified content elements and zones may be returned as labeled DOMs, including labels corresponding to the various "nodes," as depicted visually with respect to FIG. 5B, below.

Figure 4:
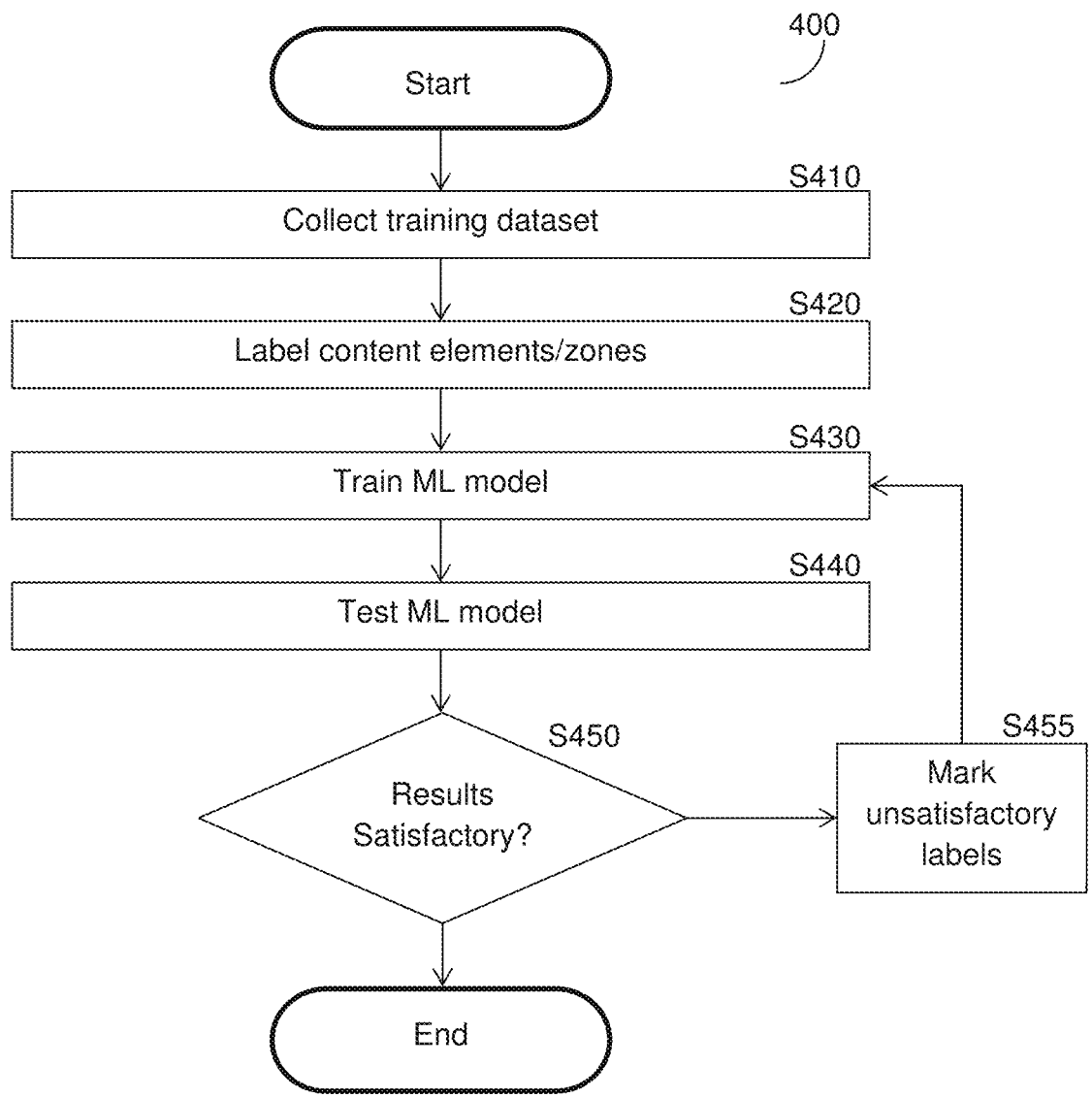
FIG. 4 is an example flowchart describing a method for training a system for automatic detection of webpage zones of interest, according to an embodiment.

FIG. 4 is an example flowchart 400 describing a method for training a system for automatic detection of webpage zones of interest, according to an embodiment.

At S410, one or more training datasets are collected. Training datasets may include one or more webpages, HTML code sets, DOMs, other, like, data, and any combination thereof. The contents of the one or more training datasets may include a variety of content zones, elements, and other content types, which be pre-labeled, partially-pre-labeled, or unlabeled. The training datasets can be collected from the database, 150, of FIG. 1, above.

At S420, content elements and zones are labeled. Zones may be labeled at S420 based on one or more the specifications of label categories, label sub-categories, and the like. Labeling content elements and zones at S420 may further include appending labels to the appropriate sections of the webpage's underlying HTML code, to the appropriate "nodes" of the webpage's unlabeled DOM, as described with respect to FIG. 5A, below, or both.

At S430, a machine learning model is trained. It may be noted that, while a machine learning model is included in the flowchart 400, one or more similar or identical models may be included without loss of generality or departure from the scope. Models similar or identical to machine learning models may include, without limitation, neural networks, deep learning systems, unsupervised machine learning systems, and any combination thereof. The machine learning model may be trained by analysis of the content element and zone labels applied at S420 and the correspondence of such labels with the contents of the HTML code from which the webpages included in the training dataset arise. The HTML code of the webpages included in the training dataset may be analyzed using natural language processing (NLP) techniques, as well as other, like, techniques, to isolate characters, strings, and other text features corresponding to the labels applied at S420.

Machine learning model training at S430 may include the development of one or more rules defining correspondences between the labels applied at S420 and the identified characters, strings, and other text features, identified using NLP and other techniques. Where a pattern of correlation between a given text feature and a given applied label is detected, machine learning model training at S430 may include generating one or more rules based on the detected correlation. In the application of a machine learning model, as trained at S430, such rules may be applied to label a given content element or zone based on the contents of the underlying HTML code.

Machine learning model training at S430 may further include the development of one or more rules defining correspondences between labeled objects within a webpage DOM, such as the labeled nodes of FIG. 5B, below. Where a pattern of correlation between the zones or elements represented by specific "nodes" in a DOM and the labels applied to the same DOM "nodes" is detected, machine learning training S430 may include generating one or more rules based on the detected correlation. In application of a machine learning model trained at S430, such rules may be applied to label a given content element or zone based on the contents of the webpage DOM.

Further, training at S430 may include training, as described hereinabove, using a dataset, such as a dataset labeled at S420, or any portion thereof. Where less than a complete dataset, such as a portion of a dataset, is used during training, the portion of the dataset not used during training may be retained, archived, or otherwise preserved to validate the trained model, such as during testing at S440. In an embodiment, a portion of a dataset may include a specified fraction of a dataset, such as, as an example and without limitation, 80%. Where a portion of a dataset includes a specified fraction, the remaining portion of the dataset may be retained as described hereinabove.

At S440, the machine learning model trained at S430 is tested. The machine learning model may be tested at S440 by analysis of one or more webpages according to the rules developed during training at S430. During testing at S440, the machine learning model trained at S430 may be configured to apply one or more labels to content elements or zones of the webpage or webpages included in the dataset, providing one or more labeled webpages for subsequent manual review.

Where training at S430 includes training based on a portion of a dataset, as described hereinabove, testing at S440 may include testing based on the portion or portions of the same dataset not used during training at S430. Where testing at S440 includes testing based on the portion or portions of the dataset not used during training at S430, testing at S440 may include testing the trained model against the portion or portions not used during training at S430 and comparing the results of such testing with the labels applied to the same portion or portions at S420.

At S450, it is determined whether the results of the testing at S440 are satisfactory. During determination at S450, feedback from, for example, a user, administrator, or other reviewer may be collected to determine whether the labels applied during testing at S440 correspond with the contents of the webpage labeled during testing. Further, determination at S450 may include comparison of one or more training datasets, labeled during testing at S440 as described hereinabove, with the same dataset or datasets, as labeled manually during training at S420. During determination at S450, one or more labeled content elements or zones may be reviewed. Where all content elements or zones are correctly labeled, or where a percentage or number of correct labels exceeds a predetermined threshold, execution of the training method terminates. Where the number of incorrect labels exceeds a predefined threshold, requiring revision of the machine learning model, execution of the training process continues at S455.

At S455, unsatisfactory labels are marked. Marking unsatisfactory labels may include specifying one or more content elements to which incorrect labels are applied. Where unsatisfactory labels are marked at S455, rules corresponding to the unsatisfactory label or labels, such as those rules generated during training at S430, may be flagged, either automatically or manually, and included in retraining input provided in the continuation of the training process at S430. Where all unsatisfactory labels are marked, and the corresponding rules are flagged, the marked labels and flagged rules are returned as inputs into the execution of the machine learning model training step at S430, providing for revision of the machine learning model based on the flagged unsatisfactory rules.

Figure 5A:
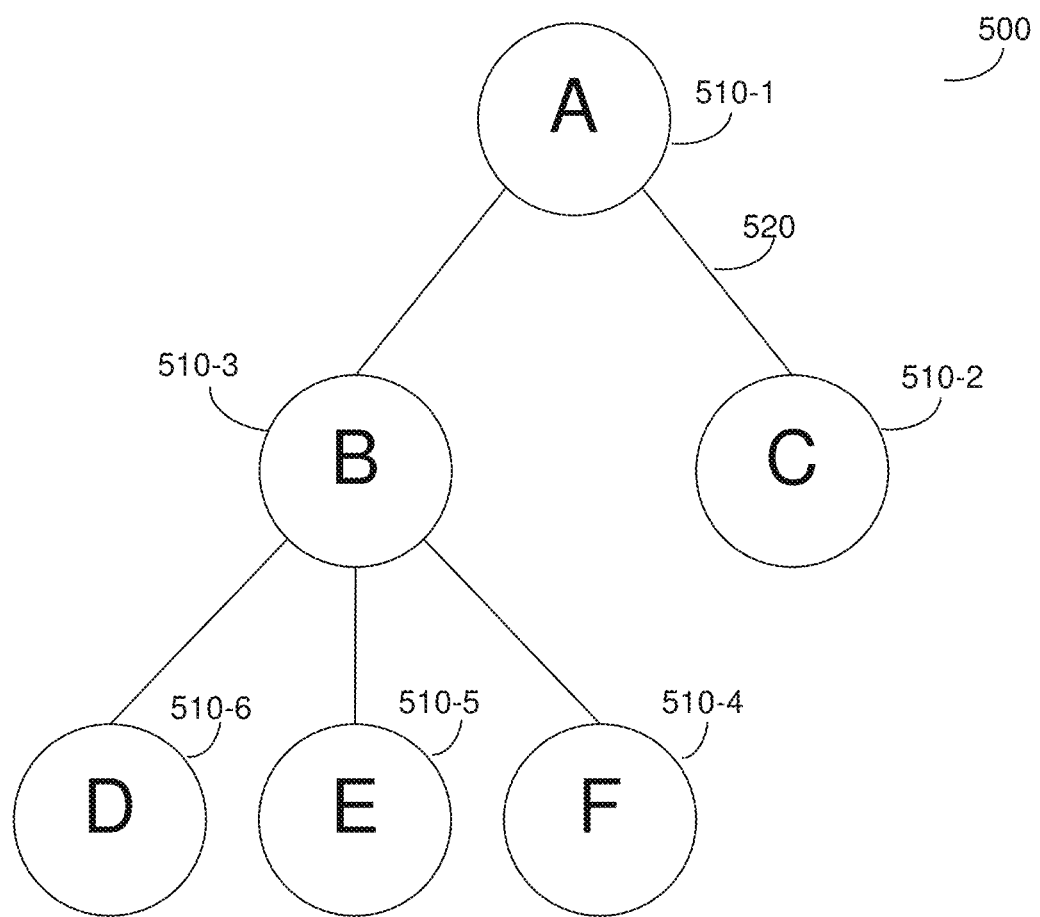
FIG. 5A is a diagram depicting an unlabeled document object model (DOM) tree, according to an embodiment.

FIG. 5A is a diagram depicting an unlabeled document object model (DOM) tree 500, according to an embodiment. The unlabeled DOM tree 500 provides a visual representation of the hierarchical structure of a webpage's HTML code, with content zones or elements represented as nodes, 510-1 through 510-6 (hereinafter, "nodes" 510). In the example unlabeled DOM tree 500, related nodes 510 are joined by "links" 520, representing the relationships between two nodes 410. In the example unlabeled DOM tree 500, links 520 are established between nodes 510-1 and 510-2 and between nodes 510-3 and 510-1. In the example unlabeled DOM tree 500, nodes 510-3 and 510-2 are disposed on a second tier below the first tier occupied by node 510-1, reflecting a structure wherein the content element or zone represented by node 510-1 includes the content elements or zones represented by nodes 510-2 and 510-3. Although only the link 520 between nodes 510-1 and 510-2 is labeled, this label is provided for simplicity, and other, like, links 520 may be likewise labeled without loss of generality or departure from the scope of the disclosure.

Figure 5B:
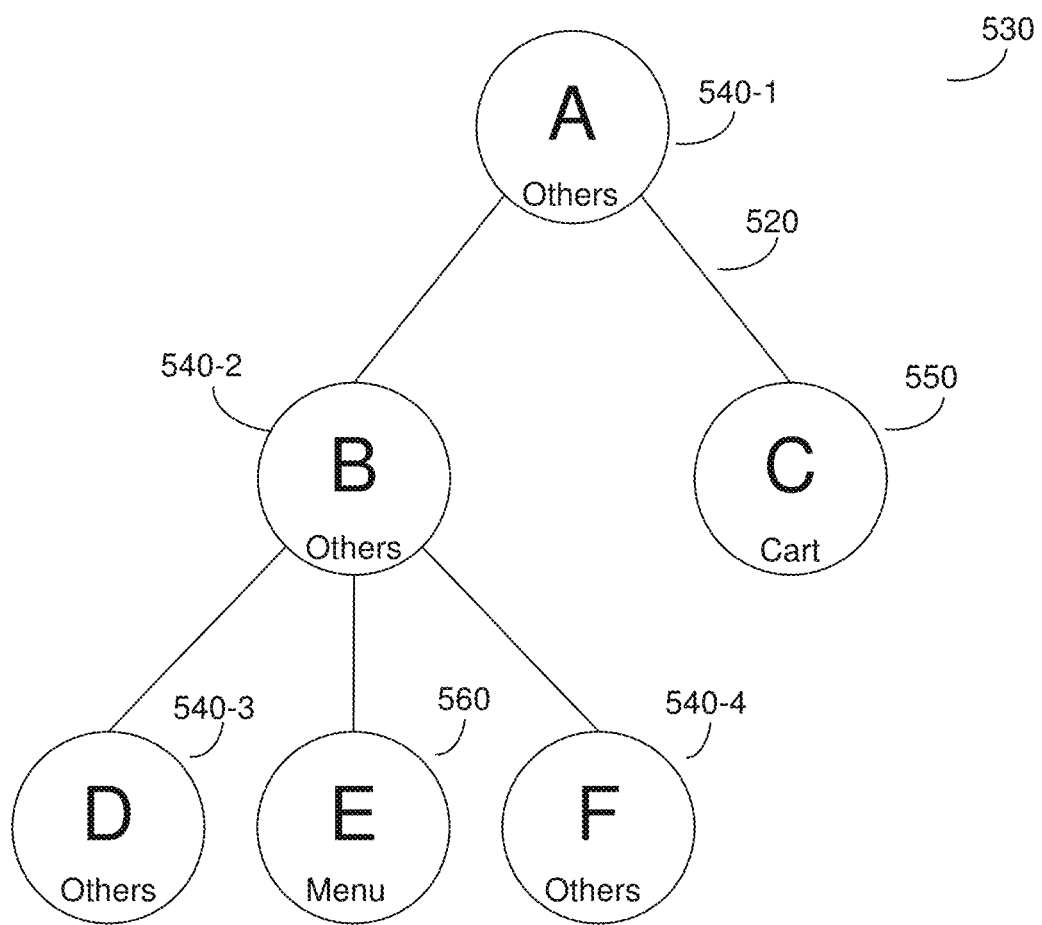
FIG. 5B is a diagram depicting a labeled document object model (DOM) tree, according to an embodiment.

FIG. 5B is a diagram depicting a labeled document object model (DOM) tree 530, according to an embodiment. The labeled DOM tree 530 includes a plurality of nodes, labeled as "others," 540-1 through 540-4 (hereinafter, "other nodes" 540), "cart" 550, and "menu" 560, joined by "links" 520 representing relationships between the various nodes. The various nodes, 540, 550, and 560, may be labeled nodes of an unlabeled DOM tree, such as the unlabeled DOM tree, 500, of FIG. 5A, above. Nodes may be labeled according to methods similar or identical to those described hereinabove, and "other" nodes 540 may be so labeled where the labeling method or methods applied do not provide for labeling of the content zone or element types represented by the respective "other" nodes 540. Similarly, nodes such as "cart" 550 and "menu" 560 may be so labeled according to the content zone or element types represented by the various nodes. Although only the link 520 between nodes 540-1 and 550 is labeled, this label is provided for simplicity, and other, like, links 520 may be likewise labeled without loss of generality or departure from the scope of the disclosure.

FIG. 6 is an example page and zone categorization table 600, according to an embodiment. The page and zone categorization table 600 includes a plurality of categories, 610-1 through 610-N (hereinafter, "category" 610 and "categories" 610), with each category 610 including a plurality of sub-categories, such as those included in the example table 600 as sub-categories 620-1 through 620-M (hereinafter, "sub-category" 620 and "sub-categories" 620). Categories 610 describe a first level of content categorization and organization, while sub-categories 620 describe a second level of categorization. Sub-categories 620 may be implemented as subsets or "members" of categories 610. In an embodiment, categories 610 and sub-categories 620 may be merged to provide a non-hierarchical set of webpage categorization labels.

The categories 610 included in the categorization table 600 include page, zone, or element types relevant to various aspects of one or more webpages. Examples of categories 610 include "cart," relevant to a digital shopping cart in an e-commerce page, and "checkout," relevant to completing a purchase in an e-commerce page. Examples of sub-categories 620 include a "delete" sub-category 620 of a "cart" category 610, relevant to elements for deleting an item from a digital shopping cart in an e-commerce page, and a "surname" sub-category 620 of an "account creation" category 610, relevant to elements for the entry of a shopper's surname during account creation.

The categorization table 600, and other, like, lists, maps, or other collections of page or zone categories 610 or sub-categories 620, may be generated by a variety of means including, without limitation, manual entry and definition, machine learning processes, collection from various sources, such as web servers and databases, other, like, means, and any combination thereof. Where the categorization table 600, and other, like, lists, maps, or other collections of zone or element categories 610 or sub-categories 620 may be generated by machine learning processes, the machine learning processes used may be supervised machine learning processes, unsupervised machine learning processes, other, like, processes, and any combination thereof.

Identically-named sub-categories 620 may be included in one or more categories 610. Where two or more sub-categories 620 with identical names are included in different categories 610, the identically-named sub-categories 620 may include content elements or zones with identical content, similar content, or content which is neither identical nor similar, but which is relevant to the same sub-category 620. As a first example, a "cart" sub-category 620 within a page having an "account creation" category 610 may include an element which, when clicked, directs a site visitor to a cart page, and an identical element may be included in a "cart" sub-category 620 within a page having a "home" category 610. In a second example, illustrating a case wherein two identically-named sub-categories 620 have content which is neither similar nor identical, a webpage zone allowing a site visitor to review the contents of their digital cart during checkout may fall within a "cart" sub-category 620 of a page having a "checkout" category 610, despite the webpage zone not including the same clickable element capable of redirecting the site visitor to a cart page, as described in the first example.

In an embodiment, pages and zones may be categorized or sub-categorized as "others" where the same pages and zones do not match predefined categories 610 or sub-categories 620, such as those included in the categorization table 600. As an example, a categorization table 600, including predefined categories 610 and sub-categories 620, includes categories 610 for "account," "menu," and "cart" zones. In the same example, where a given webpage includes ten individual zones, with one matching "account," two matching "menu," and two matching "cart," the remaining five zones are categorized as "others."

Sub-categories 620 and categories 610 may be applicable to webpage elements, webpage zones, individual webpages, and clusters of webpages. In an example, and without limitation, a webpage relevant to a "cart" category 610 may include multiple content zones, one of which may be relevant to a "menu" sub-category 620.

Figure 7A:
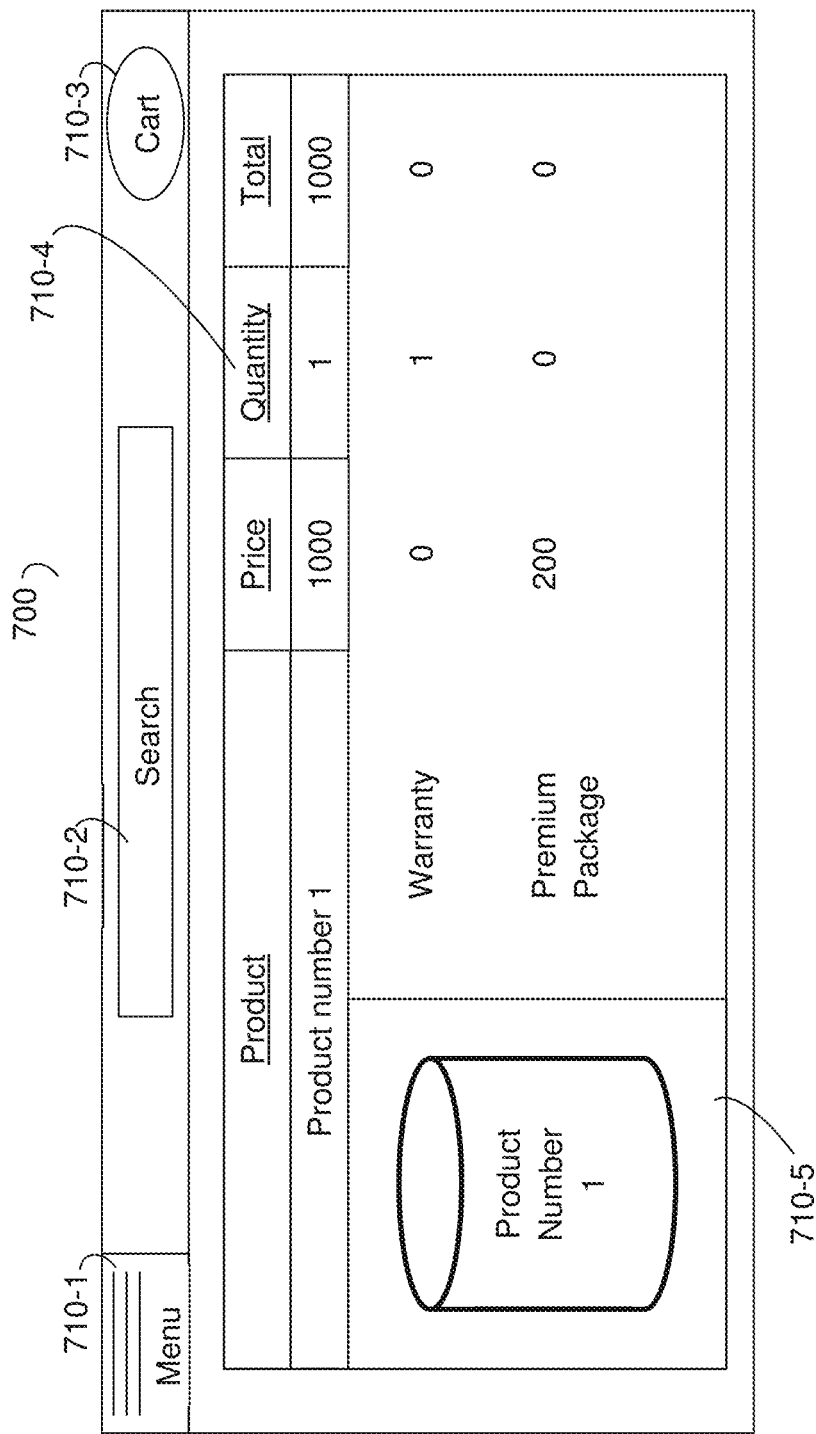
FIG. 7A is an illustration depicting a webpage prior to zone identification, according to an embodiment.

FIG. 7A is an illustration depicting a webpage 700 prior to zone identification, according to an embodiment. The webpage 700 depicted includes a plurality of content zones, 710-1 through 710-5 (hereinafter, "content zones" 710). The webpage 700 shown in the illustration provides an example of a checkout page for a shopping website and includes various elements found therein including, without limitation, a menu button 710-1, a search bar 710-2, a cart button 710-3, a quantity field 710-4, and a product image 710-5, among others. In the illustration, the webpage 700 includes content zones 710 which have not been detected or identified by content zone detection methods, such as those depicted hereinabove.

Figure 7B:
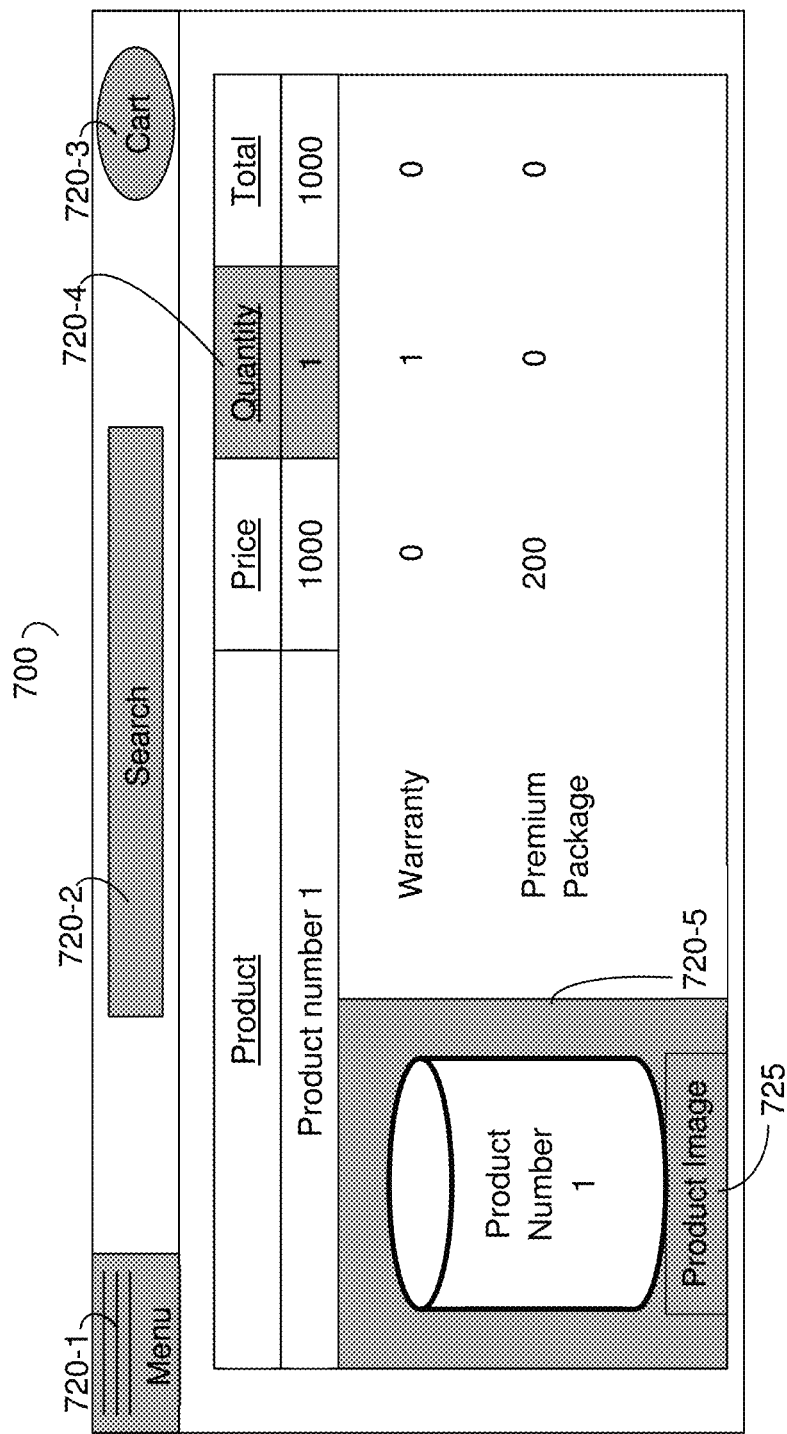
FIG. 7B is an illustration depicting a webpage following zone identification, according to an embodiment.

FIG. 7B is an illustration depicting a webpage 700 following zone identification, according to an embodiment. The webpage 700 depicted in the illustration includes a plurality of identified content zones, 720-1 through 720-5 (hereinafter, "identified content zones" 720). The identified content zones 720 included in the illustration include shading reflecting the detection of a content zone. Further, as depicted with respect to the "product image" label 725, one or more identified content zones 720 may include labels 725 reflecting the contents of the respective content zones. Although only a "product image" label 725 is included in FIG. 7B for sake of simplicity, it may be understood that additional labels 725 may be included in the various identified content zones 720 without loss of generality or departure from the scope of the disclosure. Identified content zones 720 may be identified according to the methods described hereinabove.

Figure 7C:
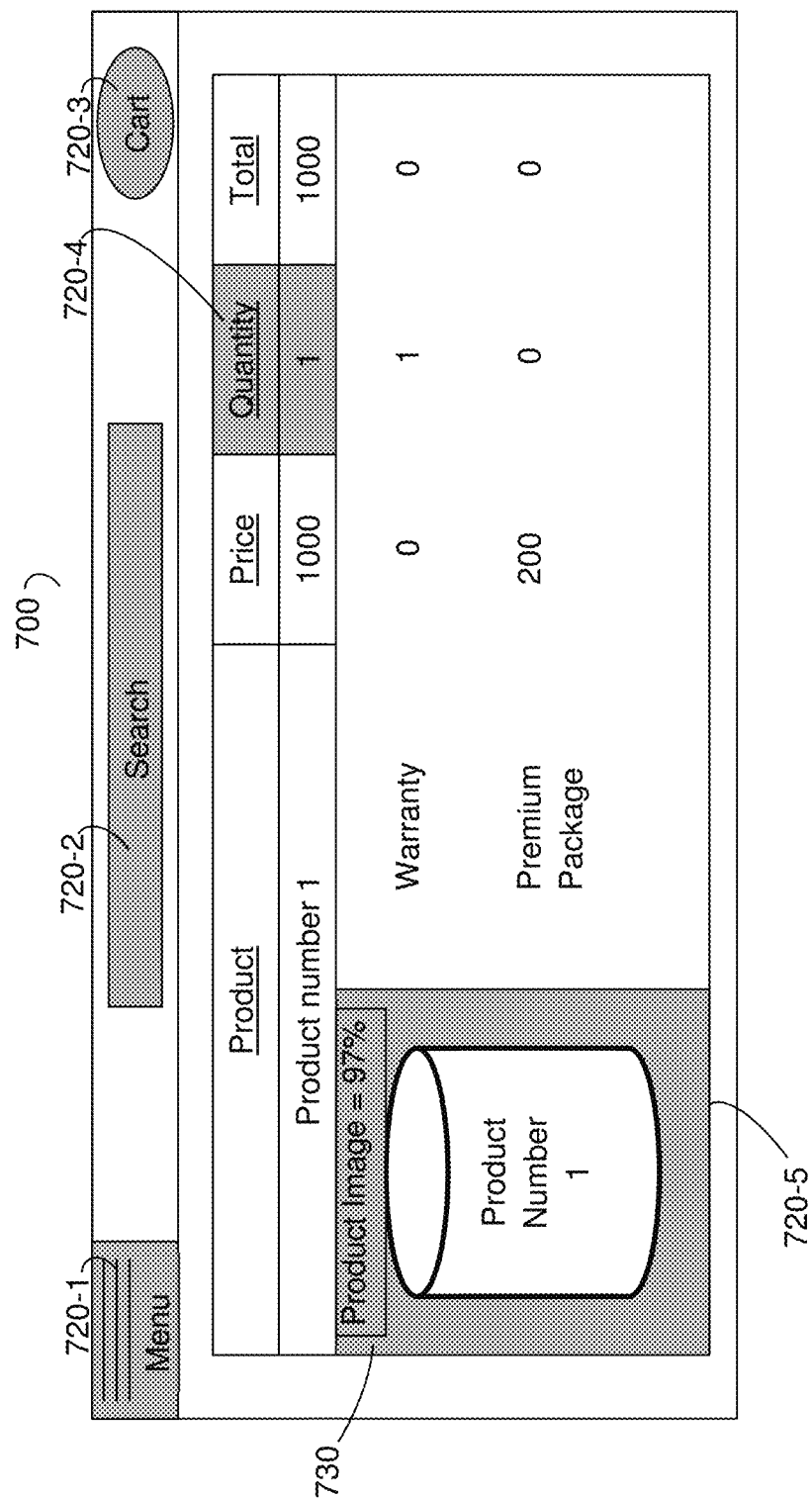
FIG. 7C is an illustration depicting a webpage following zone identification and including a zone identification confidence score, according to an embodiment.

FIG. 7C is an illustration depicting a webpage 700 following zone identification and including a zone identification confidence score 730, according to an embodiment. The webpage 700 depicted in the illustration includes a plurality of identified content zones, 720-1 through 720-5 (hereinafter, "identified content zones" 720). The identified content zones 720 included in the illustration include shading reflecting the detection of a content zone. Identified content zones 720 may be identified according to the methods described hereinabove. Further, the webpage 700 depicted in the illustration includes an example of a zone identification confidence score 730. The zone identification confidence score 730 reflects the confidence that a given identified content element or zone 720 matches the category or label attached to the identified zone 720 during identification. Zone identification confidence scores 730 may be determined according to the methods described hereinabove, and may be applicable to one or more identified content zones 720 of the same webpage, including the case of simultaneous determination and display of zone identification confidence scores 730 for some or all of the identified content zones 720 of a webpage 700.

Figure 8:
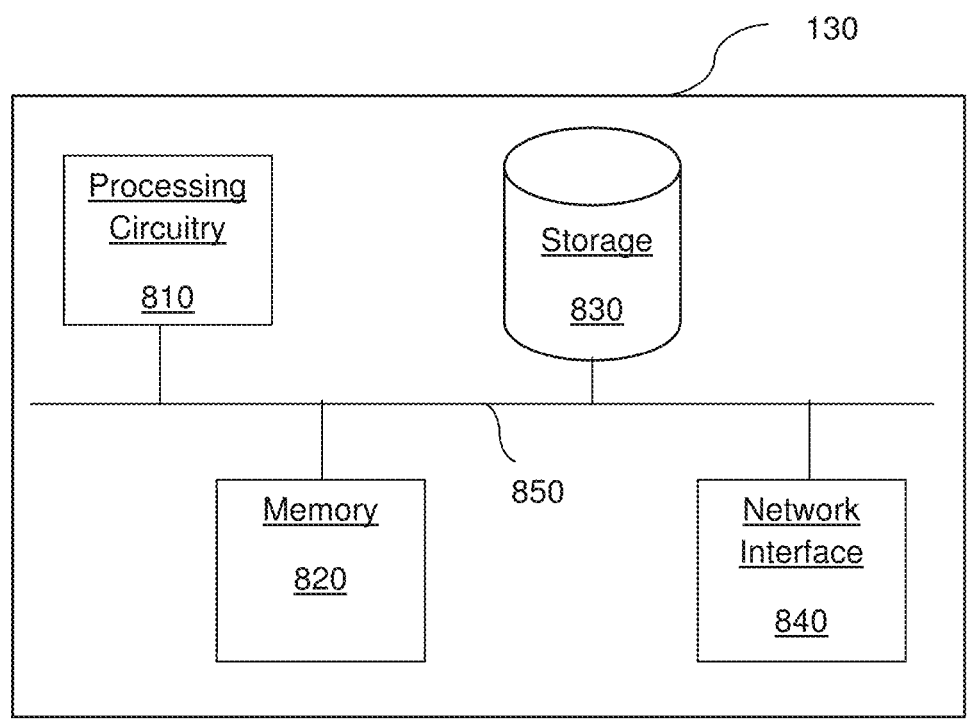
FIG. 8 is a schematic diagram of an analytic engine, according to an embodiment.

FIG. 8 is an example schematic diagram of an analytic engine 130, according to an embodiment. The analytic engine 130 includes a processing circuitry 810 coupled to a memory 820, a storage 830, and a network interface 840. In an embodiment, the components of the engine 130 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the analytic engine 130 to communicate with the various components, devices, and systems described herein for automatic detection of webpage zones of interest, and for other, related, purposes.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Further, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
   receiving a webpage analysis request, wherein the webpage analysis request comprises a webpage in a website and a specification of a page category, the specification of the page category comprising relevant webpage zones associated with sub-categories of the page category;
   identifying, in the webpage, at least one zone of the relevant webpage zones, wherein the at least one zone is a content element of the webpage;
   classifying the at least one zone into a category of interest, wherein the classification is based on a trained machine learning model configured to classify document object model (DOM) elements of the webpage, and wherein a category of interest is a category determined based on a functionality of the website;
   storing the classification by indicating the category of interest for the at least one zone; and
   displaying a visual representation of the webpage, the visual representation comprising at least one zone indicator and at least one content identification score, wherein the at least one zone indicator comprises a shaded highlight over the at least one zone and a zone label, and wherein the at least one content identification score is generated based on HTML code of the at least one zone of the webpage and further based on classification rules developed during training of the machine learning model.

2. The method of claim 1, wherein the at least one content identification score is a percentage that reflects the likelihood that the at least one zone matches its respective classification.

3. The method of claim 1, wherein classifying the at least one zone into the category of interest further comprises:
   extracting a DOM for the webpage;
   identifying content elements and zones in the DOM;
   classifying content elements and zones using the trained machine learning model; and
   returning classified content elements and zones.

4. The method of claim 1, wherein generating the trained machine learning model further comprises:
   collecting a training dataset;
   labeling content elements and zones in the collected training dataset;
   training the machine learning model; and
   testing the trained machine learning model against an unlabeled page.

5. The method of claim 4, further comprising:
   evaluating the results of the testing of the trained machine learning model against an unlabeled page;
   marking unsatisfactory labels; and
   retraining the machine learning model.

6. The method of claim 1, wherein the website is an e-commerce website.

7. The method of claim 1, wherein the category of interest includes a default category, wherein the default category does not designate a specific category of interest.

8. A non-transitory computer readable medium having stored thereon instructions for causing a processing circuitry to execute a process, the process comprising:
   receiving a webpage analysis request, wherein the webpage analysis request comprises a webpage in a website and a specification of a page category, the specification of the page category comprising relevant webpage zones associated with sub-categories of the page category;
   identifying, in the webpage, at least one zone of the relevant webpage zones, wherein the at least one zone is a content element of the webpage;
   classifying the at least one zone into a category of interest, wherein the classification is based on a trained machine learning model configured to classify document object model (DOM) elements of the webpage, and wherein a category of interest is a category determined based on a functionality of the website;
   storing the classification by indicating the category of interest for the at least one zone; and
   displaying a visual representation of the webpage, the visual representation comprising at least one zone indicator and at least one content identification score, wherein the at least one zone indicator comprises a shaded highlight over the at least one zone and a zone label, and wherein the at least one content identification score is generated based on HTML code of the at least one zone of the webpage and further based on classification rules developed during training of the machine learning model.

9. A system for detecting webpage zones of interest, comprising:
   a processing circuitry; and
   a memory, the memory containing instructions that, when executed by the processing circuitry, configure the system to perform operations comprising:
   receiving a webpage analysis request, wherein the webpage analysis request comprises a webpage in a website and a specification of a page category, the specification of the page category comprising relevant webpage zones associated with sub-categories of the page category;
   identifying, in the webpage, at least one zone of the relevant webpage zones, wherein the at least one zone is a content element of the webpage;
   classifying the at least one zone into a category of interest, wherein the classification is based on a trained machine learning model configured to classify document object model (DOM) elements of the webpage, and wherein a category of interest is a category determined based on a functionality of the website;
   storing the classification by indicating the category of interest for the at least one zone; and
   displaying a visual representation of the webpage, the visual representation comprising at least one zone indicator and at least one content identification score, wherein the at least one zone indicator comprises a shaded highlight over the at least one zone and a zone label, and wherein the at least one content identification score is generated based on HTML, code of the at least one zone of the webpage and further based on classification rules developed during training of the machine learning model.

10. The system of claim 3, wherein the at least one content identification score is a percentage that reflects the likelihood that the at least one zone matches its respective classification.

11. The system of claim 9, wherein the system is further configured to:
   extract a DOM for the webpage;
   identify content elements and zones in the DOM;
   classify content elements and zones using the trained machine learning model; and
   return classified content elements and zones.

12. The system of claim 9, wherein the system is further configured to:
   collect a training dataset;
   label content elements and zones in the collected training dataset;
   train the machine learning model; and
   test the trained machine learning model against an unlabeled page.

13. The system of claim 12, wherein the system is further configured to:
   evaluate the results of the testing of the trained machine learning model against an unlabeled page;
   mark unsatisfactory labels; and
   retrain the machine learning model.

14. The system of claim 9, wherein the website is an e-commerce website.

15. The system of claim 9, wherein the category of interest includes a default category, wherein the default category does not designate a specific category of interest.

\* \* \* \* \*

UNITED STATES PATENT AND TRADEMARK OFFICE
CERTIFICATE OF CORRECTION

PATENT NO. : 11,487,844 B2
APPLICATION NO. : 16/915190
DATED : November 1, 2022
INVENTOR(S) : Frikha et al.

It is certified that error appears in the above-identified patent and that said Letters Patent is hereby corrected as shown below:

In the Specification

In Column 2, Line 18, after "and", delete a linebreak

In the Claims

In Column 17, Line 5, in Claim 9, delete "HTML," and insert --HTML-- therefor

In Column 17, Line 9, in Claim 10, delete "claim 3," and insert --claim 9,-- therefor Signed and Sealed this
Third Day of October, 2023

Katherine Kelly Vidal
*Director of the United States Patent and Trademark Office*